Aug. 30, 1927.
R. M. RUCK
1,640,808
GEAR CHANGING APPARATUS
Filed Dec. 12, 1925  6 Sheets-Sheet 1
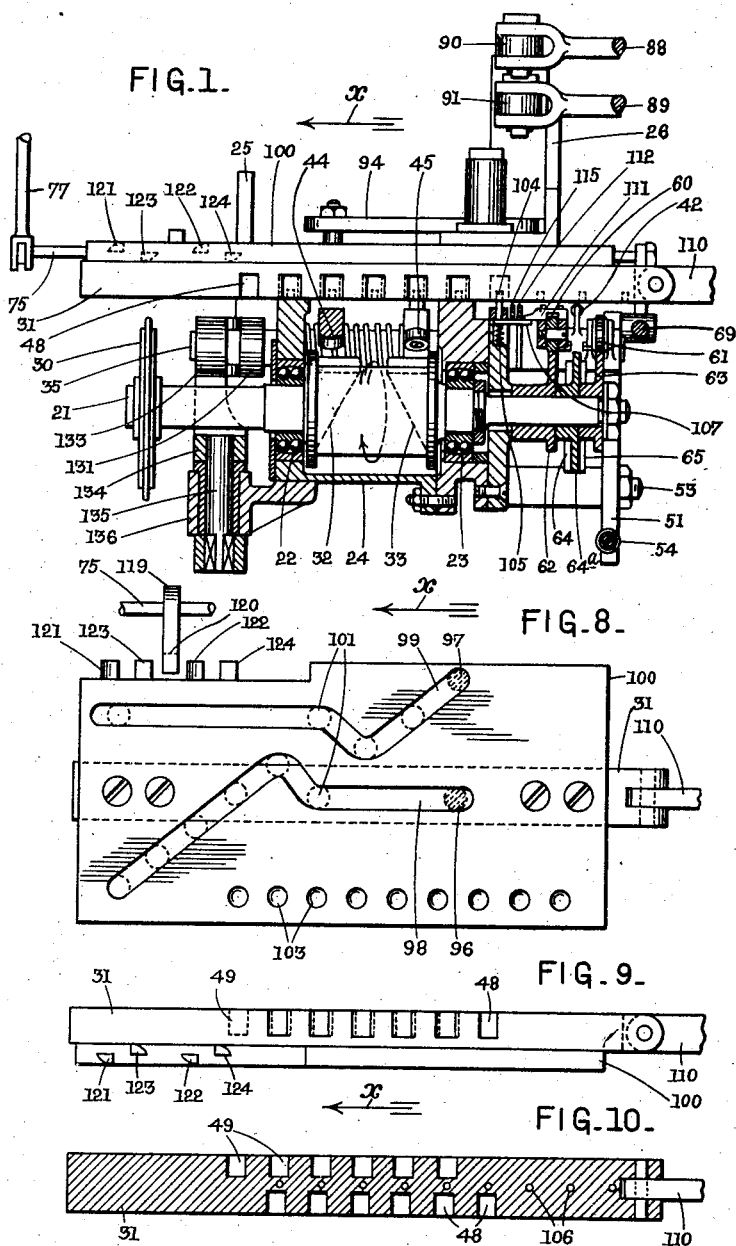
INVENTOR
RICHARD MATTEWS RUCK
BY
ATTORNEYS

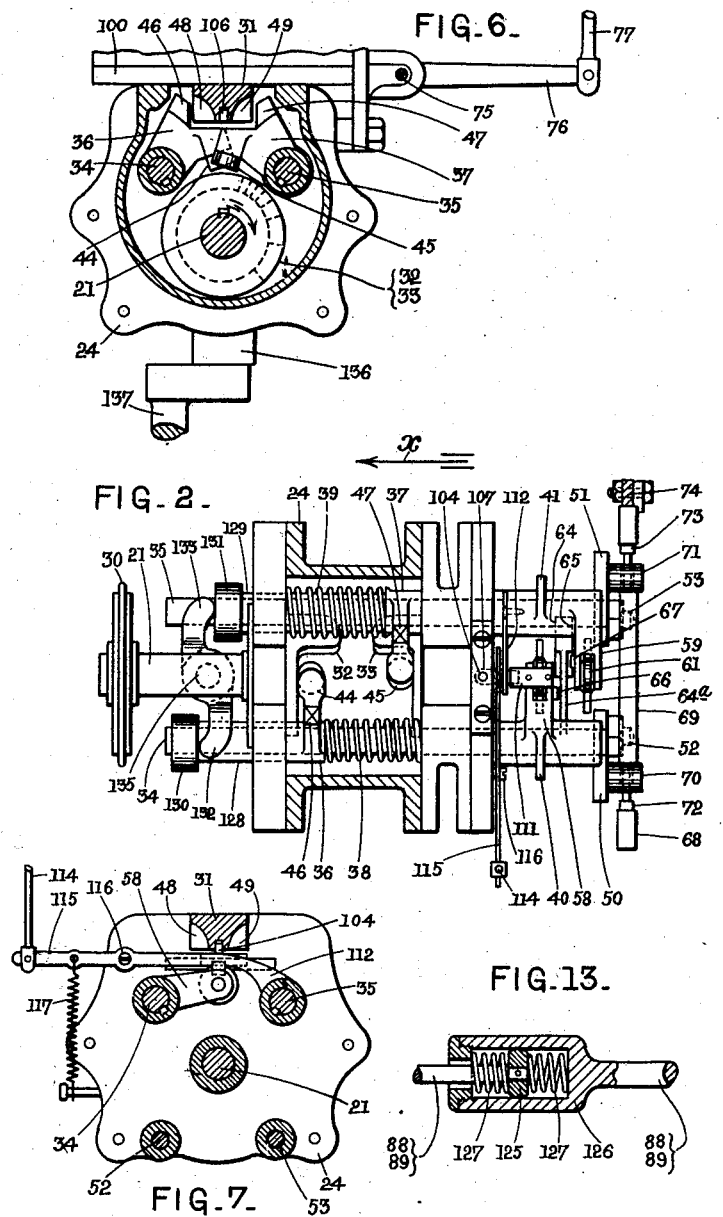

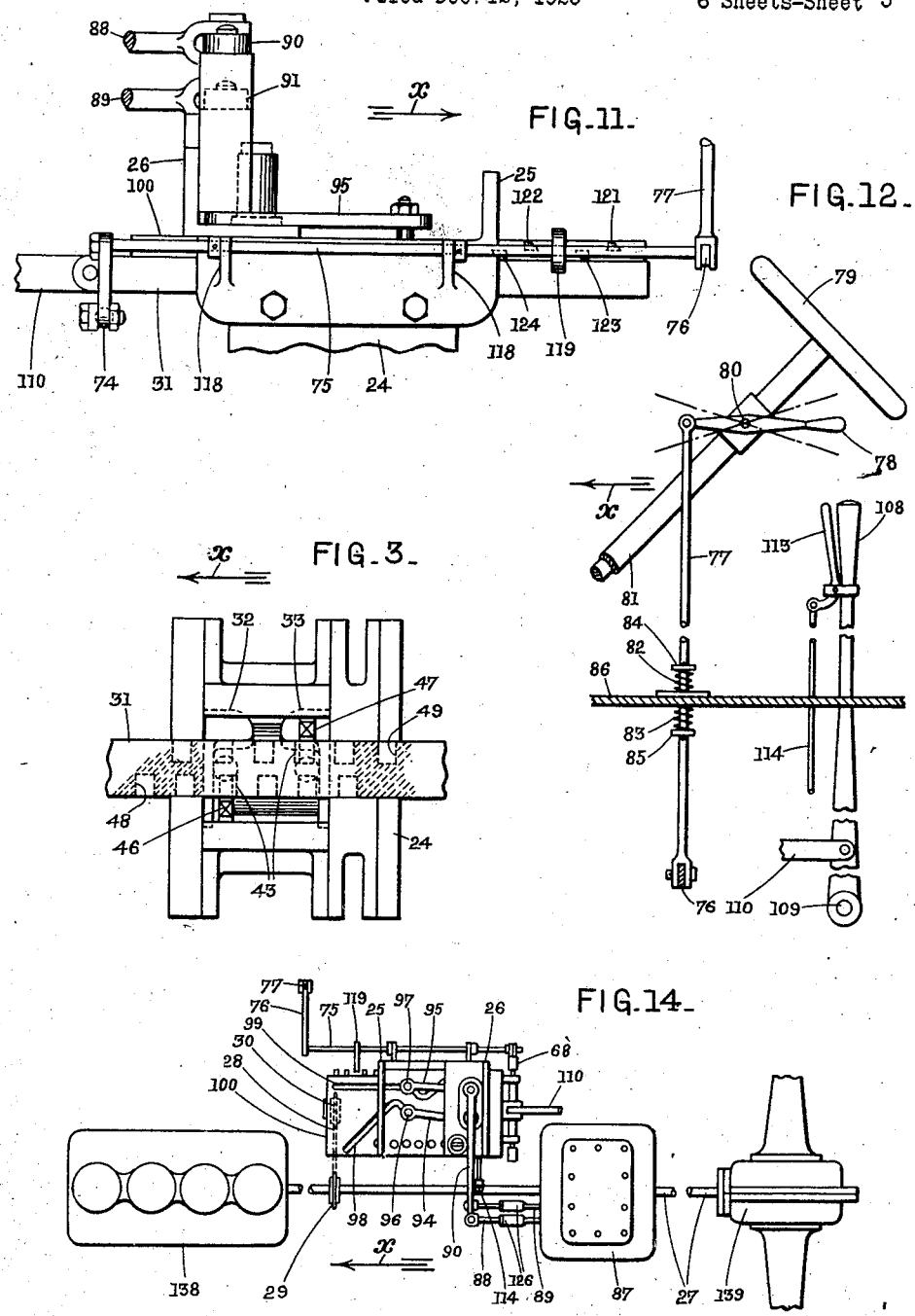

Aug. 30, 1927.
R. M. RUCK
1,640,808
GEAR CHANGING APPARATUS
Filed Dec. 12, 1925   6 Sheets-Sheet 4
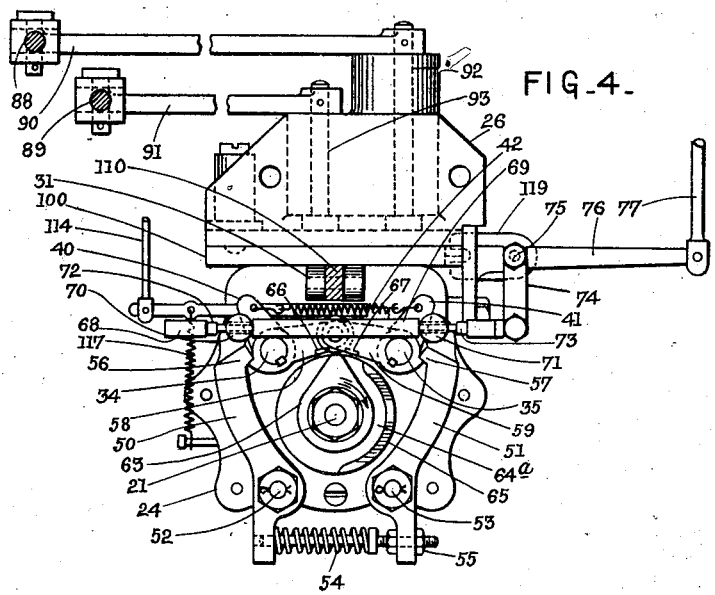
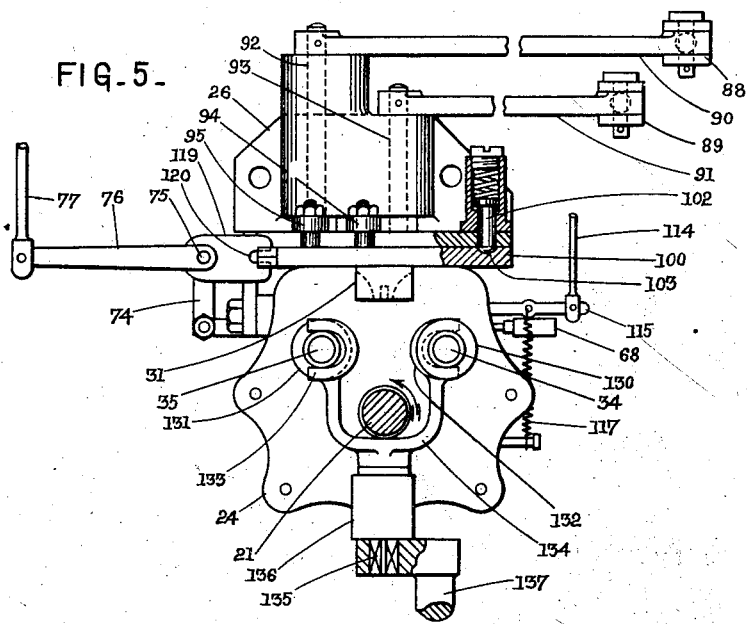
INVENTOR
RICHARD MATTHEWS RUCK
BY
ATTORNEYS

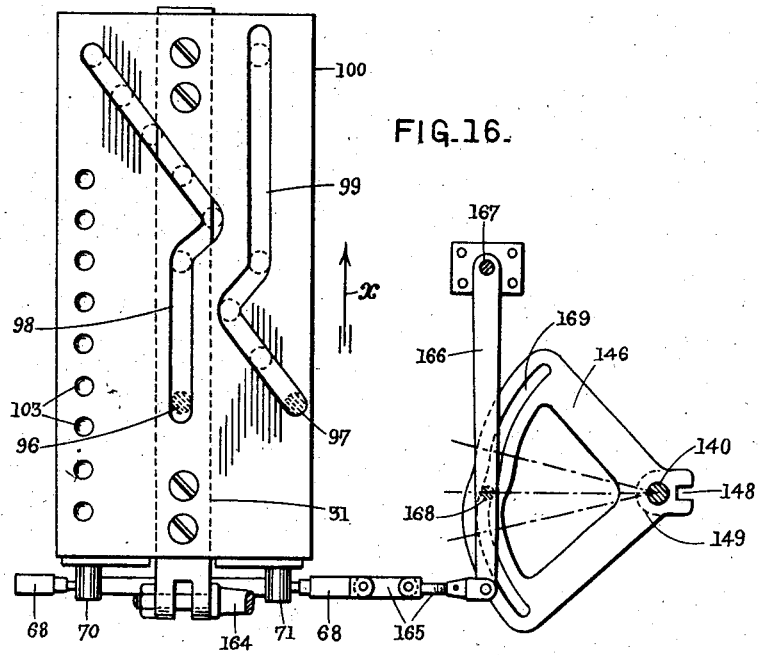
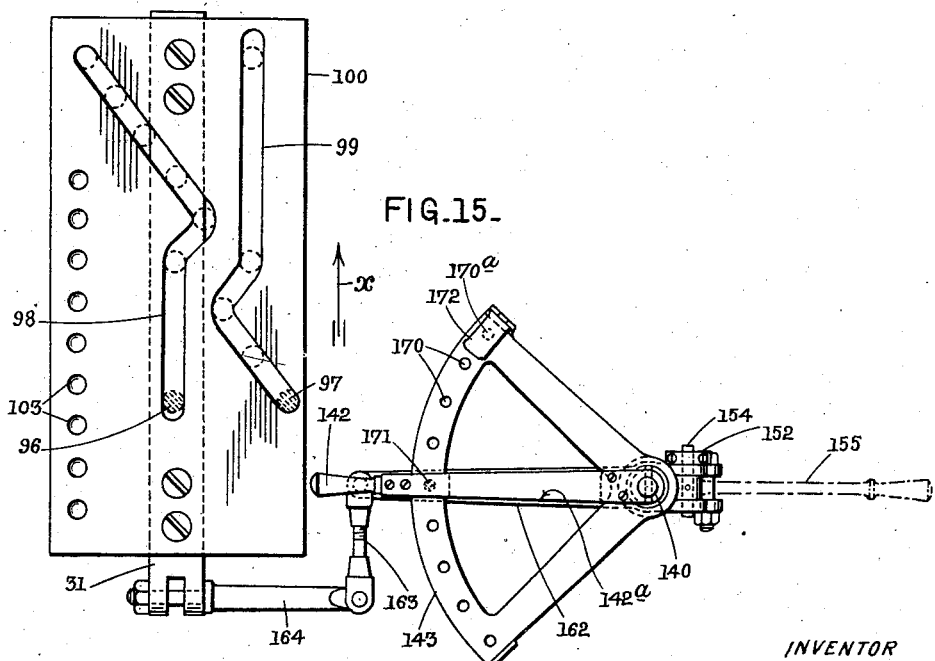

Aug. 30, 1927.
R. M. RUCK
1,640,808
GEAR CHANGING APPARATUS
Filed Dec. 12, 1925    6 Sheets-Sheet 6
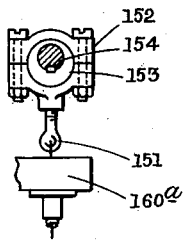
FIG. 18.
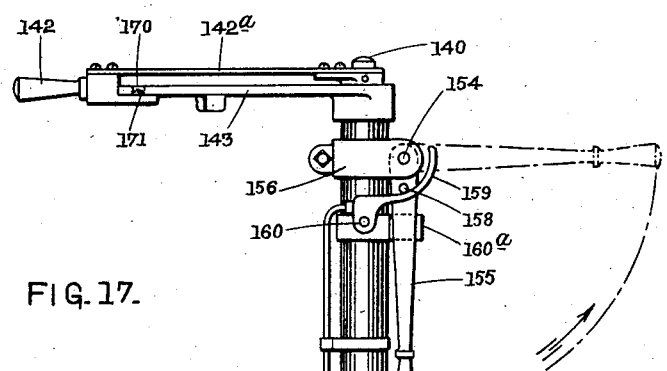
FIG. 17.
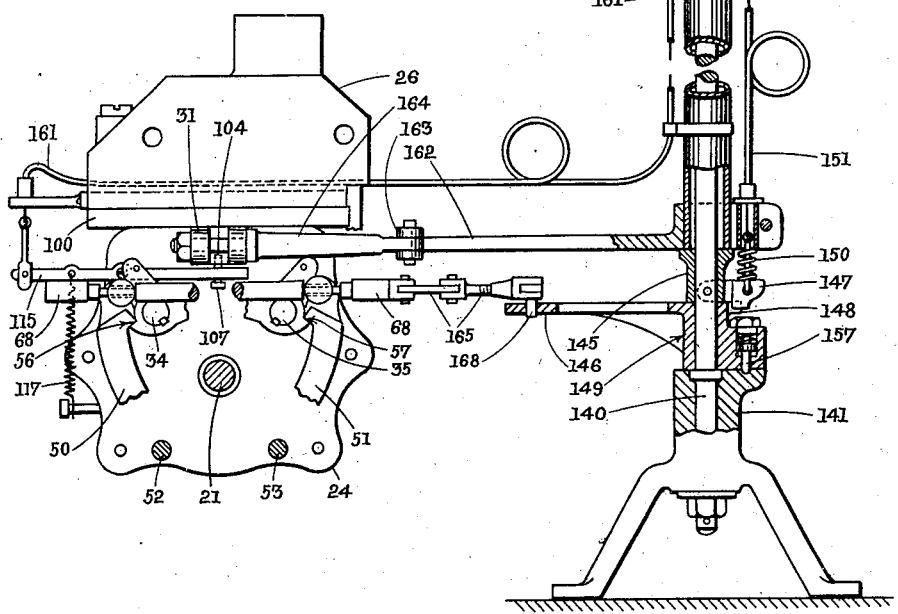
INVENTOR
RICHARD MATTHEWS RUCK
BY
ATTORNEYS Patented Aug. 30, 1927.

1,640,808

UNITED STATES PATENT OFFICE.

RICHARD MATTHEWS RUCK, OF LONDON, ENGLAND.

GEAR-CHANGING APPARATUS.

Application filed December 12, 1925, Serial No. 74,939, and in Great Britain December 12, 1924.

This invention relates to manually-controllable, automatically-acting, power-operated, step-by-step gear-changing apparatus of the general type referred to in the specification of my previous British Letters Patent No. 187,317, and it has for its primary object to provide a greatly simplified construction more especially as regards the parts concerned in the manual control and in the connection between the "main slide" of the automatically-acting portion of the apparatus and what may be termed the "displaceable element" (e. g. clutch-member, slidable pinion, or the like) of each transmission train or group comprised in the gear-changing apparatus.

By the present invention, the use of a "gate" in combination with the gear-changing hand-lever of an automobile vehicle is dispensed with, and all changes of gear are brought about as the result solely of simple longitudinal movements of the main slide which, when operated automatically, is actuated by power as before step-by-step in one direction or the other on manual initiation of any step in a change of gear and, when operated manually, is actuated by a hand-lever or equivalent device the position of which relatively to its total travel (whether produced automatically or manually) may if desired serve to indicate the condition of the gear for the time being.

For the purpose of the present invention the main slide is formed as before with notches in two series for engagement by the respective pawl-levers each of which is splined upon and movable lengthwise of a separate rocking-shaft, the one in the one direction or the other in the opposite direction alternatively, when such pawl-lever is engaged with the corresponding main cam under the control of the locking and timing mechanism, so that, according as the one or the other timing-lever is released by its locking-lever under selective manual control, the main slide will be caused to travel lengthwise in the one or the other direction to the extent of one step for each complete revolution of the continuously-running main- or cam-shaft of the automatic portion of the apparatus, any such step, when once initiated, being automatically carried to completion and the main slide being thereupon locked in the position to which it has been brought, whilst at the same time the pawl-lever which has been employed is, with all other moving parts, returned automatically to normal position.

Also, for the purpose of the present invention, the number of notches of each series, in the main slide, corresponds with the total number of steps required for effecting changes of gear automatically, upward or downward as the case may be, including the steps into and out of the neutral position which intervenes between any two gear-positions; this arrangement being similar to that set forth in the specifications of U. S. Letters Patent Nos. 1,389,347 and 1,355,510.

According to the present invention, the position, lengthwise of its own axis, of the before-mentioned displacement element (clutch-member, slidable pinion, or the like) of each transmission train or group comprised in the gear-changing apparatus is controlled by the main slide through the medium of cam-mechanism in accordance with the position of the main slide lengthwise of its own total travel; so that whether the main slide be for the moment actuated automatically or manually, its occupancy of any one of the series of its possible definite positions will result in the production of one, and only one, of the series of possible definite conditions of the change-speed gearing.

The cam-mechanism just mentioned may comprise a cam-member movable to-and-fro as one with the main slide and grooved or slotted to engage, in the case of each displaceable element as above mentioned, a cam-stud or the like coupled (as by a selector-bar) to said displaceable element and movable transversely of the path of the cam-member; the groove or slot with which any particular cam-stud engages extending parallel to the direction of movement of the cam-member throughout such portion or portions of its length as may correspond, when in operative position, with the interval during which said displaceable element remains stationary concurrently with a movement of transference then being imparted to any other displaceable element, but the groove or slot being oblique to said direction, towards the appropriate side and to the requisite extent, at such portion or portions of its length as correspond, when in operative position, with a movement of the first-mentioned displaceable element from one definite position to the next. The connection between the cam-stud and the displaceable element controlled thereby is preferably elastic so as to avoid positive obstruction to the automatic action of the apparatus, or injury to the teeth of a dog-clutch or shifting pinion (constituting the displaceable element of the transmission train) in the event of failure of such teeth to engage at the moment of entry into a fresh gear.

Means may also be provided for causing manual actuation of the main slide to bring about, first, the automatic unlocking of said slide. Means may further be provided whereby the movement of the main slide in effecting a step in a change of gear, when such change is automatically produced, is caused to restore to normal position, by positive action, the hand-lever by which said step was initiated, thus notifying the driver of the completion of the step.

In the accompanying drawings, Figures 1 to 14 inclusive illustrate one form of the invention as adapted for use in connection with the variable speed gear of an automobile vehicle, while Figures 15 to 18 inclusive illustrate a modification.

Figure 1 is a sectional side elevation of the apparatus; Figure 2 is a plan view, the parts overlying the casing being removed; Figure 3 is a partial plan view, showing only the position, relative to the main cams, of the notches in the main slide; Figures 4 and 5 are respectively a rear and a front elevation; Figure 6 is a cross section, showing only the relation between the main cams, the pawl-levers, and the main slide; Figure 7 is a sectional rear elevation, showing only the means for automatically unlocking the main slide; Figure 8 is a plan view of the cam-plate; Figure 9 is an edge view of the same, inverted; Figure 10 is an inverted sectional plan view of the main slide; Figure 11 is a part side elevation of the upper portion of the apparatus, viewed oppositely to Figure 1; Figure 12 is a side elevation of the means for effecting manual control; Figure 13 is a longitudinal section of the elastic coupling interposed in the length of a selector-bar; and Figure 14 is an elementary or diagrammatic general plan view of the apparatus, showing its relation to the engine, the gear-box, and the differential, but omitting various parts for the sake of clearness.

Figures 15 and 16 are plan views of part of the apparatus, these views (which are otherwise similar) being taken respectively at a higher and a lower level of Figure 17, which is a rear elevation, partly in section, of a modified arrangement of devices for, alternatively, manually initiating each step in an automatically-produced change of gear, and manually changing gear without the use of the automatic portion of the apparatus. Figure 18 shows a detail, drawn to a larger scale.

The arrow marked $x$, wherever it appears, indicates the forward direction of running of the vehicle.

Referring first to Figures 1 to 14, the cam-shaft 21 of the automatic gear-changing apparatus, extends, as before, horizontally through, and is journalled in ball-bearings 22, 23 at the front and rear ends of a casing 24 which is adapted to be secured by brackets 25, 26 to the chassis of the vehicle; the shaft 21 receiving motion continuously from the engine-shaft 27 through an endless sprocket-chain 28 which passes around sprocket-wheels 29 and 30 on the shafts 27 and 21 respectively. Vertically above and parallel with the cam-shaft 21, the main slide 31 is fitted to reciprocate longitudinally in guides in the casing 24, such movements of the slide 31 being effected either on the one hand automatically, step-by-step and in the required direction as the result of the action of one or other of a pair of oppositely-acting but similar and angularly coincident face-cams 32, 33 (hereinafter termed the main cams) fast on the shaft 21 within and towards the opposite ends of the casing 24, or on the other hand manually (as will be described hereinafter) in the event of the automatic portion of the apparatus not being brought into play.

For the purpose of effecting the automatic step-by-step movements of the main slide 31 in one or the other direction alternatively, a pair of rocking-shafts, 34, 35 which extend through the casing 24 above and on either side symmetrically of the cam-shaft 21, are fitted to turn through a small angle in bearings in the ends of the casing; the respective rocking-shafts 34, 35 having splined upon them the hubs of a pair of pawl-levers 36, 37 both of which are normally out of operation but either of which alternatively is capable of being brought, by angular movement of the rocking-shaft 34 or 35, into position both to engage the main slide 31 and also to be acted upon by the corresponding main cam 32 or 33, so as not only to be displaced by said cam to the extent of one step lengthwise of its rocking-shaft 34 or 35 in the direction corresponding to the inclination of the cam, but also to communicate such movement to the main slide 31 in the same direction. Each pawl-lever 36 or 37 is normally retained in position against the end of the casing 24 adjacent to its own main cam 32 or 33, by means of a thrust-spring 38 or 39 coiled about the corresponding rocking-shaft 34 or 35; whilst both rocking-shafts constantly tend to assume their operative angular position under the stress of a spring 42 (Figure 4) stretched between a pair of arms 40, 41 fast on the respective shafts 34, 35 outside the rear end of the casing 24. Each pawl-lever 36 or 37 carries an antifriction roller 44 or 45 adapted, when the lever is depressed into operative position, to co-operate with the corresponding main cam 32 or 33, whilst the upper end 46 or 47 of the lever is adapted to enter simultaneously a notch of the corresponding one of two series of notches 48, 49 formed respectively on the adjacent lower corners of the main slide 31. The length of each notch is made sufficient to allow, as at 43 (Figure 3) an amount of "lost motion" between the pawl-lever and main slide sufficient to afford time for the automatic disengagement of the driving-clutch (not shown) by means hereinafter described, before the main slide begins to be moved.

The rocking-shafts 34, 35 are normally retained in their inoperative angular position by means of a pair of "locking-levers" 50, 51 fulcrumed at 52, 53 outside the casing 24 beyond and beneath the rear bearing 23 of the cam-shaft 21 (see Figure 4); the lower arms of these locking-levers being forced apart by a thrust-spring 54, adjustable at 55, so as to cause ribs 56, 57 on the levers to engage notches on the hubs of a pair of "timing-levers" 58, 59 which are fast on the adjacent ends of the respective rocking-shafts. The timing-levers, 58, 59 extend from their respective rocking-shafts towards one another in parallel planes and carry, on normally-coincident axes vertically above and parallel with the axis of the cam-shaft 21, antifriction rollers 60, 61 each of which is adapted, when the corresponding timing-lever 58 or 59 is released by its locking-lever 50, or 51, to descend under the action of the spring 42. This spring 42, when thus permitted to act, causes the rocking-shaft 34 or 35 to turn so as, on the one hand, to bring the pawl-lever 36 or 37 into engagement both with a notch of the series 48 or 49 in the main slide 31 and also with the main cam 32 or 33, and on the other hand to bring the roller 60 or 61 into contact with the edge of a "locking-cam" 62 or 63 whereby, at the proper moment, that timing-lever 58 or 59 which has been depressed is raised again to normal position so as to restore to its normal or inoperative angular position the particular rocking-shaft 34 or 35 which has been allowed to turn, and thus to reset all the coacting parts in normal position.

The locking-cams 62, 63, which are similar and angularly coincident, are fast side-by-side on the cam-shaft 21 outside the rear bearing 23, and between them there is also fast upon the same shaft a "timing-cam" 64ª consisting of a disc from the opposite faces of which, throughout rather less than one half the circumference, project a pair of similar and angularly coincident arcuate "timing-flanges" 64, 65. From those faces of the timing-levers 58, 59 which are adjacent to the timing-cam, project studs 66, 67 each of which, so long as its timing-lever occupies its normal or inoperative angular position, remains outside the path of the corresponding timing-flange 64 or 65, but which, when said timing-lever comes into operative position, is presented inside the path of the timing-flange. The angular interval during which the timing-flanges 64, 65 are passing the studs 66, 67 coincides substantially with that portion of a revolution of the cam-shaft 21 wherein a main cam 32 or 33 can shift a pawl-lever 36 or 37 lengthwise of its rocking-shaft 34 or 35, and can therefore move the main slide 31 to the extent of one step in one direction or the other, and during such interval the individual timing-flanges 64, 65 so co-operate with the respective studs 66, 67 as either on the one hand to prevent the timing-levers 58, 59 from leaving their inoperative position, or on the other hand to prevent whichever of said timing-levers (if either) has been brought to operative position, from being accidentally withdrawn therefrom.

The release of the respective timing-levers 58, 59 (only one of which can be brought into operation at a time) is effected through the medium of a horizontal "releasing-link" 68 (Figure 4) extending transversely of the locking-levers 50, 51 and having the equivalent of a pin-and-slot engagement with the respective locking-levers. In the example illustrated, the link 68 passes through and is doubly shouldered at 69 to engage projections 70, 71 on the respective locking-levers, and is also shouldered at 72, 73 to engage said projections from the opposite directions respectively; the arrangement being such that, according as the link 68 is moved from its normal position longitudinally in one direction or the other, that locking-lever 50 or 51 against which the shoulder 69 is thus caused to bear will be disengaged from the hub of the corresponding timing-lever 58 or 59, whilst the other locking-lever 51 or 50 will be prevented positively from becoming disengaged from the hub of the corresponding timing-lever 59 or 58.

The releasing-link 68 is adapted to be moved in one direction or the other at will, for which purpose it is attached at one end to one arm 74 of a bell-crank lever fulcrumed at 75 and having its other arm 76 coupled by a rod 77 to a small hand-lever 78 mounted in convenient proximity to the driver's steering wheel 79. In the example illustrated, the hand-lever 78 is fulcrumed at 80 to the steering-pillar 81 immediately beneath the wheel 79 (see Figure 12); the rod 77 passing upwards through a hole in the floor of the vehicle and being normally retained by elastic pressure in that longitudinal position which corresponds with the mid or normal position of the releasing-link 68, for which purpose a pair of balanced springs 82, 83, mounted in compression between collars 84, 85 on the rod 77, take their abutment against the opposite surfaces of the floor 86. The hand lever 78 is moved upward or downward according as it is required to perform a step upward or downward in the operation of changing gear automatically.

In the example illustrated, the displaceable elements of the transmission train in the gear box are assumed to be two in number, and the number of gear-ratios to be four in addition to reversal; Nos. I and II gears, as well as reversal, being dependent upon the position of the one displaceable element, whilst Nos. III and IV gears are dependent upon the position of the other displaceable element. It is also assumed that, in the example, no provision is made for reversal by means of the automatic portion of the gear-changing apparatus; reversal being effected only by hand, although it might equally well be brought about by the automatic portion of the apparatus, as will appear hereinafter.

In Figure 14, 87 represents the gear-box, and 88, 89 the two selector-bars through which the respective displaceable elements (understood to be slidable pinions, not shown) are controlled. The selector-bars are attached by their forward end each to one arm 90 or 91 of a bell-crank lever fulcrumed at 92 or 93, the other arm 94 or 95 of this lever carrying a pin 96 or 97 which engages in a cam-slot 98 or 99 formed in a cam-plate 100 fixed to the main slide 31 (see Figure 8); the arrangement being such that, whether the main slide be actuated automatically or manually, its occupancy of any one of its possible definite positions will have for effect to produce one, and only one, of the possible definite conditions of the transmission train within the gear-box. For this purpose the cam-slots 98 and 99 extend side-by-side, in the general direction of the movement of the main slide 31, each both forward and rearward from what may be regarded as a common middle-point 101 corresponding with the neutral position between No. II and No. III gears. The respective slots 98 and 99 are reversely disposed with reference to one another so that a straight portion of the one slot extends, parallel to the path of the main slide 31, alongside of the oblique portions of the other slot; the arrangement being such that whilst on the one hand the slot 98 affords means for producing those movements of the lever 90, 94 and selector-bar 88 which are required for effecting the changes incidental to the passage, step-by-step, from reverse, through neutral, No. I gear, neutral, No. II gear, to neutral at the middle-point 101, on the other hand the slot 99 affords means for producing those movements of the lever 91, 95 and selector-bar 89 which are required for effecting the remaining changes incidental to the passage, step-by-step, from the last-mentioned neutral (i. e. point 101), through No. III gear, and neutral, to No. IV gear. It will of course be understood that when either of the cam-slots 98 or 99 is in position to cause its oblique portion to move the co-acting lever 90 or 94, or 91, 95, the straight portion of the other cam-slot 99 or 98 is in position to hold the other lever 94 or 90 against movement.

The production of the entire series of changes of gear in succession in either order, involves eight steps of movement of the main slide 31 in the corresponding direction; but inasmuch as the two changes from No. I gear, through neutral, to reverse (and conversely) are assumed to be effected only manually in the example illustrated, provision requires to be made only for producing six steps of movement of the main slide 31 automatically in either direction. Hence, as will be observed, the main slide is shown as furnished with only six notches in each series 48 and 49; but it will be evident that provision for automatic reversal could be made, if desired, by the simple expedient of providing two additional notches in each series 48 and 49.

The nine possible definite positions of the main slide 31 and cam-plate 100 are determined by means of a stationary spring-pressed plunger 102 (Figure 5) adapted to engage, at the respective positions, with one or another of a series of nine rounded depressions 103 in the upper surface of the cam-plate; the utility of this spring-jumper being specially apparent when the changes of gear are being effected by hand. In order, however, to ensure against the main slide 31 becoming displaced from any of its definite positions in consequence of shock or jarring, provision is made (substantially in the manner set forth in the specification of U. S. Letters Patent No. 1,355,510) for automatically locking, by positive means, the main slide on its reaching each of its definite positions, for automatically unlocking the slide just prior to the automatic performance of a step of movement in either direction, and also for automatically unlocking the slide just prior to the manual production of a step of movement. In the present example this locking device is arranged as follows:—

A locking-pin 104 (Figures 1 and 7), vertically movable (without turning) in a guide in the end of the casing 24 between the rear bearing 23 and the nearest locking-cam 62, is pressed upward by a spring 105 so as to tend to engage in any of a series of holes 106 provided upon the underside of the main slide 31 and corresponding in number and distance apart with the series of possible definite positions of the slide (see Figure 10). An arm 107 projecting rearward from the locking-pin 104 is adapted to be engaged and depressed, so as to withdraw the pin 104 from whichever of the holes 106 it has entered, by means which operate automatically whenever either of the timing-levers 58, 59 comes into operative position, and also whenever the main slide 31 is to be moved by hand; the manual actuation of the main slide being effected by a so-called "reversing-lever" 108 (Figure 12) fulcrumed at 109 and coupled to the rear end of the slide 31 by a link 110. The timing-lever 58 carries a projection 111 adapted to engage from above with the arm 104, which is also adapted to be similarly engaged by an arm 112 angularly movable as one with the other timing-lever 58, so that depression of either timing-lever (on the initiation of a step in the automatic production of a change of gear) will have, as its primary result, the unlocking of the main slide 31. Moreover, a finger-lever 113, pivoted to the handle of the reversing-lever 108, is coupled through a rod 114 to one arm of an unlocking-lever 115 fulcrumed at 116, the other arm of this lever being adapted so to engage from above with the arm 104 that, on the reversing lever 108 being grasped in order to move the main slide 31 independently of the automatic portion of the apparatus, the levers 113 and 115 will be actuated, in opposition to a spring 117, to cause withdrawal of the locking-pin 104.

It will be understood that the automatic portion of the apparatus is normally out of action, to which inoperative condition it is automatically returned (after a step in a change of gear has been carried out) on the completion of that revolution of the cam-shaft 21 during which such step has taken place. It will also be understood that each step of movement performed by the automatic mechanism is complete in itself; a change of gear from neutral (i. e. no gear) to any one of the speeds for which provision is made, or vice versa, being performed in one step, corresponding to one revolution of the cam-shaft 21. Hence, as a complete change of gear from one speed to the next, upward or downward, always involves the necessity of passing through neutral gear, such complete change of gear requires two steps of movement, equivalent to two revolutions of the cam-shaft. The performance, by the automatic portion of the mechanism, of such two steps in immediate sequence without interruption can, however, be ensured by the driver maintaining his pressure, upward or downward, upon the small hand-lever 78 during the very brief interval which elapses from the moment when he initiates the first step until the second step has been carried to completion. The period of time thus occupied is so short that the driver may occasionally, through inadvertence, maintain his pressure upon the lever 78 too long, thus in some cases causing the main slide 31 and cam-plate 100 to overshoot the required point in their travel and, it may be, throwing the gearing into neutral position before the mistake is noticed.

In order to prevent, as far as possible, the occurrence of such an error through inadvertence, means are provided whereby the movement of the main slide in effecting a step in a change of gear, when automatically produced, is caused to restore the hand-lever 78 to normal position, thus also giving the driver warning that the moment has arrived for him to release his pressure on the hand-lever unless he actually wishes a further step of change to be performed. For this purpose the fulcrum 75 of the bell-crank lever 74, 76, through which the releasing-link 68 is operated, is constituted by a shaft extending alongside of and at the same level as the cam-plate 100 in bearings 118 (see Figure 11), the shaft 75 having fast upon it an arm 119 which is presented towards the adjacent edge of the cam-plate; whilst the extremity of this arm 119 has a notch 120 whereof the upper or lower side (as the case may require) is adapted to be encountered at the proper moment by one or another of a series of cam-studs arranged in two pairs, upper and lower, 121, 122 and 123, 124, which project from the edge of the cam-plate at four points corresponding respectively with the approach of the cam-plate to the positions giving certain of the gears. By this means, as the cam-plate 100, during a step in a change of gear, moves relatively to the arm 119, the latter is forced downward or upward as the case may require, by the action of that cam-stud which corresponds with the particular condition of the speed-gearing which such step will serve to bring about, and consequently the operation of the automatic portion of the mechanism will be arrested unless the driver continues purposely to maintain pressure on the hand-lever 78. The reason why in the example illustrated, only two pairs of cam-studs 121 . . . 124 are provided is, that automatic restoration of the hand-lever 78 and releasing-link 68 to normal position is chiefly important, on the one hand, during downward changes of gear from neutral to No. III gear, and from neutral to No. II gear (the automatic gear-changing action ceasing of its own accord, in the example illustrated, on the completion of a downward change from neutral to No. I gear); and on the other hand, during upward changes of gear from neutral to No. II gear, and from neutral to No. III gear (it being impossible, in the example illustrated, to overshoot No. IV gear by an upward movement).

As already explained, the "lost motion" provided at 43 (Figure 3) between the pawl-levers 36, 37 and the notches 48, 49 in the main slide 31, affords time for the automatic disengagement of the driving-clutch before the main slide commences any step of its automatic movement. The same lost motion interval also allows ample time for the unlocking of the main slide; but it will be evident that, when the main slide begins to move, the particular "displaceable element" of the transmission train within the gear-box 87, to which the slide 31 then imparts an axial sliding movement may be unable, through momentary failure in registration of gear-teeth with tooth-intervals, to enter into driving engagement with the co-acting element of the train of gearing. In order to meet this well-known difficulty, each selector-bar 88 and 89 is made in two sections united by an elastic push-and-pull coupling as shown in Figure 13 . . .; the coupling comprising a head 125 on the end of the one section, fitted to slide in a cylindrical socket 126 on the adjacent end of the other section, and a pair of buffer-springs 127, confined between the head 125 and the closed ends of the socket 126. This elastic coupling serves also to relieve the driver's hand of shock when changing gear manually by means of the reversing-lever 108.

Inasmuch as the reversing-lever 108 (Figure 12), being permanently coupled by the link 110 to the main slide 31, participates in all the to-and-fro movements of the latter, the angular position of this lever 108 will always serve as an indication of the particular gear then in action, or of the particular neutral position then occupied. It may therefore be convenient in some cases to provide, alongside the lever 108, a quadrant (not shown) graduated to denote the possible definite positions of the change-speed gearing.

The means illustrated whereby the driving-clutch (not shown) is automatically thrown out of action before the main slide 31 begins to move so as to effect a step in a change of gear, and allowed to return into action on the conclusion of such step, are substantially as described in the specification of British Letters Patent No. 187,-317. That is to say, the hubs of the pawl-levers 36, 37 are prolonged as sleeves 128, 129 (Figure 2) which, encircling the rocking-shafts 34, 35, extend through the bearings of these shafts at the front end of the casing 24, beyond which the sleeves project and terminate in collars 130, 131 which bear, from opposite directions respectively, against forks 132, 133 on the arms of a Y-shaped lever 134 (Figure 5) fast on the upper end of a vertical spindle 135 fitted to turn through a small angle in a bearing 136 on the end of the casing. Whichever of the pawl-levers 36 or 37 is caused to slide lengthwise of its rocking-shaft 34 or 35 against the pressure of the spring 38 or 39 (such sliding movement being in opposite directions for the respective pawl-levers), the engagement of the collar 130 or 131 with the forked arm 132 or 133 of the lever 134 will cause the spindle 135 to turn always in the same direction. Fast on the lower end of the spindle 135 is a crank 137 to which is attached a link (not shown) so connected with the displaceable member of the driving-clutch that, each time a pawl-lever 36 or 37 begins its sliding movement under the action of the main cam 32 or 33, the driving-clutch will be disengaged before the pawl-lever, on completing the lost-motion interval 43 in that notch of the main slide with which it is engaged, begins to impart movement to the main slide and thus shifts the displaceable member of the transmission train. When the pawl-lever 36 or 37 is restored to its normal angular position on the completion of the step in a change of gear, the usual driving-clutch spring is set free to restore the displaceable member of the driving-clutch to operative position, and in so doing turns the spindle 135 back to normal position, thus assisting the spring 38 or 39 in replacing the pawl-lever 36 or 37 to normal position lengthwise of the rocking-shaft 34 or 35.

In Figure 14, 138 denotes the engine, and 139 the casing of the differential gear on the driving axle of the vehicle.

In the modified construction illustrated in Figures 15 to 18, the small hand-lever 78 and its connection with the releasing-link 68; the fulcrum-shaft 75 with its arm 119 and the cam-studs 121 . . . 124; the reversing-lever 108 and its connection with the main slide 31; and the finger-lever 113 on said reversing-lever, and its connection with the unlocking-lever 115, are all dispensed with and their several functions are performed by devices now to be described.

That is to say, in convenient proximity to the steering-wheel 79 an upright spindle 140 is fitted to turn in a stationary bearing 141, and has fast upon its upper end a spring-lever 142ª furnished with a control-handle 142 movable over and normally locked (as hereinafter explained) to a quadrant 143 which is fast on the upper end of a tubular sleeve 144 surrounding the spindle 140 and resting upon a collar 145 fast on said spindle near the lower end of the latter; the sleeve 144 being rotatable about the spindle 140. Between the collar 145 and the upper end of the bearing 141, the spindle 140 carries another quadrant 146 which is normally locked to the spindle by means of a latch 147 pivotally attached to the collar 145 and engaging with a notch 148 in the hub 149 of the quadrant 146. The latch 147 is held in engagement with the notch 148 by a spring 150, in opposition to which the latch can at will be disengaged by means of a Bowden-wire connection 151 attached at its lower end to the latch and at its upper end to the strap 152 of an eccentric sheave 153 (Figure 18) fast on the rotatable fulcrum-pin 154 of a hand-lever 155 carried by a bearing 156 near the upper end of the sleeve 144; the hand-lever 155, which normally hangs downward as shown in full lines in Figure 17, being capable of being raised to the position shown in dotted outline when it is desired to effect a change of gear without bringing into operation the automatic portion of the apparatus. When the hand-lever 155 is thus raised, the rotation imparted to its fulcrum-pin 154 and to the eccentric 153 raises the latch 147 from the notch 148 and permits of the sleeve 144 being turned by means of the hand-lever 155 without imparting movement to the lower quadrant 146, notwithstanding the fact that the rotation of the sleeve 144 causes the upper quadrant 143 and with it the control-handle 142 to turn likewise and to cause the spindle 140 to rotate in its bearing 141. When the sleeve 144 is thus turned by means of the hand-lever 155, the lower quadrant 146, which (as hereinafter explained) normally occupies the mid or neutral position indicated in Figure 16, is prevented from accidentally leaving said mid position by the action of a spring-pressed jumper 157 carried by the hub 149 of the quadrant and engaging with a depression in the upper surface of the bearing 141.

The hand-lever 155 carries a laterally-projecting pin 158 which bears against a cam-lever 159 pivoted at 160 to a bracket 160ª on the sleeve 144 and serving to actuate, through a Bowden-wire connection 161, the unlocking-lever 115 (which remains and operates as previously described), so that, when the hand-lever 155 is raised to enable a change of gear to be effected without the use of the automatic portion of the apparatus, the main slide 31 will be automatically unlocked, and will become relocked automatically on the hand-lever 155 being allowed to drop to its normal dependent position.

The main slide 31 and the sleeve 144 are permanently coupled together so as, under all circumstances, to move together as one, any angular movement imparted to the sleeve 144 producing a corresponding linear movement of the main slide 31 and vice versa. For this purpose, in the example under consideration, the sleeve 144 has fast upon its lower end an arm 162 which is coupled by a link 163 to an arm 164 projecting laterally from one end of the main slide 31; but it will be evident that the connection between the main slide and the sleeve 144 might be effected, with equal efficiency, in various other ways to suit particular circumstances.

The function of the lower quadrant 146 is to bring about the initiation of an automatic change of gear by moving the releasing-link 68 (previously described) in the one or the other direction according as the change is to be in the direction of gearing-up or gearing-down as the case may be. For this purpose the releasing-link 68 is coupled, through an intermediate link or links 165, to one end of a horizontal lever 166 the other end of which is pivoted at a stationary fulcrum 167. The lever 164 carries a pin 168 which engages a cam-slot 169 in the quadrant 146, this slot having two terminal portions of different radius concentric with the quadrant-axis (i. e. the axis of the upright spindle 140) and united by an oblique central portion as indicated in Figure 16. The total angular length of the cam-slot 169 corresponds with the total angular movement which the quadrant 146 is capable of performing, and the quadrant itself, as already stated, normally occupies the mid or neutral position shown, wherein the pin 168 lies in the oblique central portion of the cam-slot so as to maintain the releasing-link 68 in its mid or neutral position. When, however (as hereinafter explained) the quadrant 146 is caused to turn in either direction, the pin 168 is forced towards or from the quadrant-axis, thus moving the releasing-link 68 in the corresponding direction and to the requisite distance, with the result that the locking-lever 50 or 51 is released and an automatic step in a change of gear, either upwards or downwards as the case may be, is initiated. On the completion of the change, the quadrant 146 is automatically returned to its normal mid position, thus restoring the releasing-link 68 to its normal mid position.

The upper quadrant 143 is formed with an arcuate series of nine equidistant holes 170 . . . corresponding respectively with the several successive gear-conditions between, and inclusive of, No. IV gear and reverse. The control-handle 142 carries a stud 171 which constantly tends under the action of the spring-lever 142ª to engage from beneath with one or another of the holes 170, the release of the stud from any of the holes being effected by depressing the lever in opposition to the spring. All the automatically-performed changes of gear are initiated by a movement of the control-handle 142 in one direction or the other over the quadrant 143, each successive step in a change of gear being initiated by a movement of the control-handle from one of the holes 170 to the next, so that, as long as the automatic portion of the apparatus is in use, the condition of the gearing for the time being is always indicated by the position of the control-handle 142 relatively to the quadrant 143. The operation is as follows.

Movement of the control-handle 142 over the quadrant 143, from any one of the holes 170 to the next, causes the spindle 140 to turn so as to carry the lower quadrant 146 through the same angle as the control-handle, thus moving the releasing-link 68 in one direction or the other so as to initiate an automatic change of gear in the corresponding direction, upward or downward. The consequent movement of the main slide 31 imparts, through the link 163 and arm 162, a turning movement to the sleeve 144, the arrangement being such that this movement of the sleeve is always in the direction opposite to that just given to the control-handle 142, so that the upper quadrant 143, moving as one with the sleeve 144, is automatically caused to restore the control handle 142 to its normal mid position in consequence of said handle becoming engaged with the quadrant 143 on reaching its fresh position. Hence, whatever gear may for the time being be in operation, and whatever the position to which the main slide 31 and upper quadrant 143 may have been brought in producing such gear-condition, the control-handle 142 and the lower quadrant 146 are always, on the completion of a step in a change of gear, found in their normal or mid position.

In order to prevent the control-handle 142 from being inadvertently moved to such position on the upper quadrant 143 as would bring about reversal, that terminal hole 170ª of the series 170 . . . which corresponds with reverse gear may, as indicated in Figure 15, be normally covered by a flap 172 hinged to the quadrant so as to obstruct the movement of the control-handle 142 to its "reverse" position until the flap 172 has been turned back out of the way. This flap may tend to assume its normal obstructive position under the action of a spring (not shown).

I claim:—

1. The combination with an automatic gear-shifting apparatus, of a control handle therefor, said handle being displaceable in either of two directions from a normal position to cause the gears to be shifted, and means actuated by said apparatus for restoring said handle to its normal position.

2. In automatic gear-shifting apparatus, a movable cam slide, a control handle for said apparatus, said handle being displaceable in either of two directions from a normal position to cause said slide to be moved, and means actuated by the movement of said slide for restoring said handle to its normal position while the gears are being shifted.

3. In automatic gear-shifting apparatus, a slide, power driven mechanism for moving said slide, a control handle for said mechanism, said handle being displaceable in either of two directions from an inoperative position, means actuated by the movement of said slide for restoring said handle to inoperative position, and manually operable means for moving said slide.

4. In automatic gear-shifting apparatus, a slide, power-driven mechanism for moving said slide, said mechanism being normally inoperative, and manually operable means for moving said slide, said means comprising a rotatable sleeve, and connections between said slide and said sleeve whereby movement of either causes a corresponding movement of the other.

5. In an automatic gear-shifting apparatus, a slide, power-driven mechanism for moving said slide, a control handle for said mechanism, said handle being displaceable in either of two directions from an inoperative position, a quadrant having normal engagement with said handle, means actuated by movement of said slide for moving said quadrant and said handle, and manually operable means for moving said slide.

6. An automatic gear-shifting apparatus comprising a main slide provided with two cam elements, power-driven means for actuating said slide in a step-by-step movement, bell cranks adapted to be actuated by said cam elements, connecting members between said bell cranks and the gears to be shifted, a rotatable shaft, a sleeve mounted on said shaft and rotatable with respect thereto, a quadrant fixed to said sleeve, a hand-lever fixed to said shaft and having releasable engagement with said quadrant, a second lever fixed to said sleeve, and connections between said slide and said sleeve whereby movement of either causes a correspondent movement of the other.

7. An automatic gear-shifting apparatus comprising a main slide provided with two cam elements, power-driven means for actuating said slide in a step-by-step movement, bell cranks adapted to be actuated by said cam elements, connecting members between said bell cranks and the gears to be shifted, a rotatable shaft, a sleeve mounted on said shaft and rotatable with respect thereto, a quadrant fixed to said sleeve, a hand-lever fixed to said shaft and having releasable engagement with said quadrant, a second lever fixed to said sleeve, connections between said slide and said sleeve whereby movement of either causes a correspondent movement of the other, and means operable by said hand-lever for controlling the operation of said power-driven means.

8. In automatic gear-shifting apparatus, a slide provided with a pair of cam elements, bell-cranks adapted to be selectively rotated by said cam elements, a yielding connection between said bell-cranks and the gears to be shifted, and power-driven means for moving said slide to shift the gears.

9. In automatic gear-shifting apparatus, a slide provided with a pair of cam elements and with a series of transverse notches, bell-cranks engaging said cam elements and adapted to be rotated thereby, a connection between said bell-cranks and the gears to be shifted, and power-driven means for engaging said notches to move said slide in step-by-step manner.

RICHARD MATTHEWS RUCK.